US012795800B2

(12) United States Patent
Xia

(10) Patent No.: US 12,795,800 B2
(45) Date of Patent: Nov. 10, 2026

(54) LIGHT SOURCE CONTROL APPARATUS, ELECTRONIC DEVICE, METHOD, STORAGE MEDIUM, AND PROGRAM PRODUCT

(71) Applicant: Beijing Zitiao Network Technology Co., Ltd., Beijing (CN)

(72) Inventor: Jiu Xia, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 131 days.

(21) Appl. No.: 18/800,602

(22) Filed: Aug. 12, 2024

(65) Prior Publication Data

US 2025/0056699 A1 Feb. 13, 2025

(30) Foreign Application Priority Data

Aug. 11, 2023 (CN) ........................ 202311014519.0

(51) Int. Cl.
*H05B 47/155* (2020.01)
*H05B 47/16* (2020.01)
*H05B 47/17* (2020.01)

(52) U.S. Cl.
CPC ........... *H05B 47/155* (2020.01); *H05B 47/16* (2020.01); *H05B 47/17* (2020.01)

(58) Field of Classification Search
CPC ............. G06F 3/013; G06F 2203/0381; G06F 3/0416; A61B 3/113; A61B 3/0008; B60Q 1/1423; F21S 43/14; F21S 43/245
See application file for complete search history.

(56) References Cited

U.S. PATENT DOCUMENTS 10,585,530 B2 * 3/2020 Eriksson ................. G06F 3/041
2010/0066975 A1 * 3/2010 Rehnstrom ............ A61B 3/113 351/210
2014/0292665 A1 * 10/2014 Lathrop ................ G06F 3/0416 345/173
2014/0293226 A1 * 10/2014 Hainzl ............... G02B 27/0093 351/210
2017/0269787 A1 * 9/2017 Eriksson ............... G06F 3/0412

FOREIGN PATENT DOCUMENTS

CN 112015265 A 12/2020

OTHER PUBLICATIONS

Extended European Search Report for European Application No. 24193882.8, mailed Dec. 16, 2024, 8 Pages.

* cited by examiner

*Primary Examiner* — Monica C King

(57) ABSTRACT

The disclosure provides a light source control device, an electronic device, a method, a storage medium and a program product. The device includes an eye movement tracking light source, a proximity detection light source and a control circuit, the control circuit being respectively connected to the eye movement tracking light source and the proximity detection light source; and the control circuit is configured to control the eye movement tracking light source and the proximity detection light source to be alternately turned on. The eye movement tracking light source and the proximity detection light source are controlled to be alternately turned on through the control circuit, so that the eye movement tracking light source and the proximity detection light source are not turned on at the same time, the light of each other does not interfere with each other.

14 Claims, 3 Drawing Sheets

LIGHT SOURCE CONTROL APPARATUS 100

LIGHT SOURCE CONTROL APPARATUS 100

LIGHT SOURCE CONTROL APPARATUS 100

LIGHT SOURCE CONTROL APPARATUS 100

LIGHT SOURCE CONTROL APPARATUS, ELECTRONIC DEVICE, METHOD, STORAGE MEDIUM, AND PROGRAM PRODUCT

CROSS REFERENCE TO RELATED APPLICATIONS

The present application claims priority to Chinese Patent Application No. 202311014519.0, filed on Aug. 11, 2023 and entitled "LIGHT SOURCE CONTROL APPARATUS, ELECTRONIC DEVICE, METHOD, STORAGE MEDIUM, AND PROGRAM PRODUCT", the entirety of which is incorporated herein by reference.

FIELD

The application relates to the field of circuit control technologies, and in particular, to a light source control apparatus, an electronic device, a method, a storage medium, and a program product.

BACKGROUND

In some electronic devices, both eye movement tracking and proximity sensors need to be installed, and both devices need to realize the corresponding functions by means of the light source turning on.

However, the light of these two devices may interfere with each other, so that the functions corresponding to the two devices are affected, and the accuracy is relatively low.

SUMMARY

In view of this, an object of the disclosure is to provide a light source control apparatus, an electronic device, a method, a storage medium, and a program product to solve or partially solve the above technical problem.

Based on the above object, a first aspect of the disclosure provides a light source control apparatus, comprising: an eye movement tracking light source, a proximity detection light source and a control circuit, the control circuit being respectively connected to the eye movement tracking light source and the proximity detection light source.

The control circuit is configured to control the eye movement tracking light source and the proximity detection light source to be alternately turned on.

Based on a same concept, a second aspect of the disclosure provides an electronic device, including the light source control apparatus according to the first aspect.

Based on a same concept, a third aspect of the disclosure provides a light source control method applied to a control circuit, the control circuit being respectively connected to an eye movement tracking light source and a proximity detection light source, the method comprising:

- controlling the eye movement tracking light source and the proximity detection light source to be alternately turned on.

Based on a same concept, a fourth aspect of the disclosure provides a non-transitory computer-readable storage medium storing computer instructions, where the computer instructions are configured to cause a computer to perform the method according to the third aspect.

Based on a same concept, a fifth aspect of the disclosure provides a computer program product, comprising computer program instructions, which, when executed on a computer, cause the computer to perform the method according to the third aspect.

As can be seen from the above, the light source control apparatus, the electronic device, the method, the storage medium and the program product provided by the disclosure control the eye movement tracking light source and the proximity detection light source to be alternately turned on through the control circuit, so that the eye movement tracking light source and the proximity detection light source do not be turned on at the same time, and the light of each other does not interfere with each other, so that the accuracy of the detection result of the eye movement tracking light source is improved, and meanwhile, the accuracy of the detection result of the proximity detection light source can be improved.

BRIEF DESCRIPTION OF DRAWINGS

In order to more clearly illustrate the technical solutions in the disclosure or related technologies, the accompanying drawings, which need to be used in the description of the embodiments or related technologies, are briefly introduced below, and obviously, the drawings in the following description are merely embodiments of the disclosure, and for those of ordinary skill in the art, other drawings may be obtained according to these drawings without creative efforts.

REFERENCE NUMERALS INDICATE

Figure 1A:
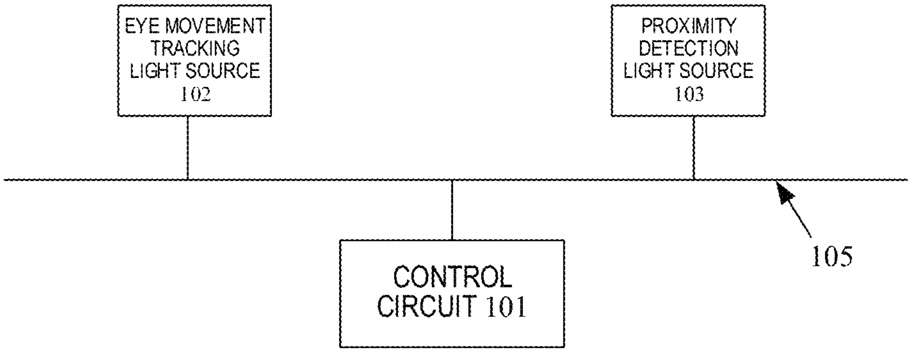
FIG. 1A is a schematic structural diagram of a light source control apparatus according to an embodiment of the disclosure.

100 Light source control apparatus;

101 Control circuit, 102, eye movement tracking light source, 1021, first eye movement tracking light source, 1022, second eye movement tracking light source, 103, proximity detection light source, 104, register, 105, integrated circuit bus;

200 Electronic device.

DETAILED DESCRIPTION

It may be understood that the data involved in the technical solution (including but not limited to the data itself, the acquisition or use of the data) should follow the requirements of the corresponding laws and regulations and related regulations.

The principles and spirit of the disclosure will be described below with reference to several exemplary embodiments. It should be understood that these embodiments are provided merely to enable those skilled in the art to better understand and then implement the disclosure, and do not limit the scope of the disclosure in any way. Rather, these embodiments are provided to make the disclosure more thorough and complete, and to fully convey the scope of the disclosure to those skilled in the art.

It is to be understood herein that any number of elements in the drawings are for the purpose of example and not limitation, and that any nomenclature is for distinguishing only, and does not have any limitation.

Based on the above description, the principles and spirit of the disclosure are set forth in detail below with reference to several representative embodiments of the disclosure.

An embodiment of the disclosure provides a light source control apparatus 100, as shown in FIG. 1A, including: an eye movement tracking light source 102, a proximity detection light source 103, and a control circuit 101, the control circuit 101 being respectively connected to the eye movement tracking light source 102 and the proximity detection light source 103.

The control circuit 101 is configured to control the eye movement tracking light source 102 and the proximity detection light source 103 to be alternately turned on.

In a specific implementation, both the eye movement tracking light source 102 and the proximity detection light source 103 are infrared light sources. During eye movement tracking, the eye movement tracking light source 102 is disposed on the eye movement tracking camera, the eye movement tracking light source 102 is turned on, the proximity detection light source 103 is turned off, and the light of the eye movement tracking light source 102 strikes the iris of the eye, so that the eye movement tracking camera can collect the iris feature, and then determine the focus position of the eye based on collected iris feature to perform eye movement tracking.

The proximity detection light source 103 generally adopts a photoelectric proximity detection light source 103, in which the beam axis of the light emitting diode (or semiconductor laser tube) and the axis of the phototransistor are on a plane. When the surface of the detected object is close to the intersection of the light sources of the proximity detection light source 103, the reflected light of the light emitting diode is received by the phototransistor to generate an electrical signal. When the object is away from the intersection, the reflection region is not in the viewing angle of the phototransistor, and the detection circuit has no output. Generally, the driving current of the light emitting diode is not a direct current, but a certain frequency of alternating current. When the proximity detection light source 103 emits light for proximity detection, the eye movement tracking light source 102 is turned off, so that the light intensity returned after the light is detected to irradiate the obstacle determines whether a proximity object exists, thereby completing the proximity detection.

Through the above solution, the control circuit 101 is used to control the eye movement tracking light source 102 and the proximity detection light source 103 to be alternately turned on, so that the eye movement tracking light source 102 and the proximity detection light source 103 do not be turned on at the same time, and the light of each other does not interfere with each other, so that the accuracy of the detection result of the eye movement tracking light source 102 is improved, and the accuracy of the detection result of the proximity detection light source 103 can also be improved.

In some embodiments, the control circuit 101 is configured to:

control the eye movement tracking light source 102 to be turned off after being turned on for a first predetermined time period, and then control the proximity detection light source 103 to be turned off after being turned on for a second predetermined time period; or control the proximity detection light source 103 to be turned off after being turned on for a second predetermined time period, and then control the eye movement tracking light source 102 to be turned off after being turned on for a first predetermined time period.

Through the above solution, the purpose of the eye movement tracking light source 102 and the proximity detection light source 103 being turned on can be achieved, so that the two are not interfered with each other, and the accuracy of the two is improved.

Figure 1B:
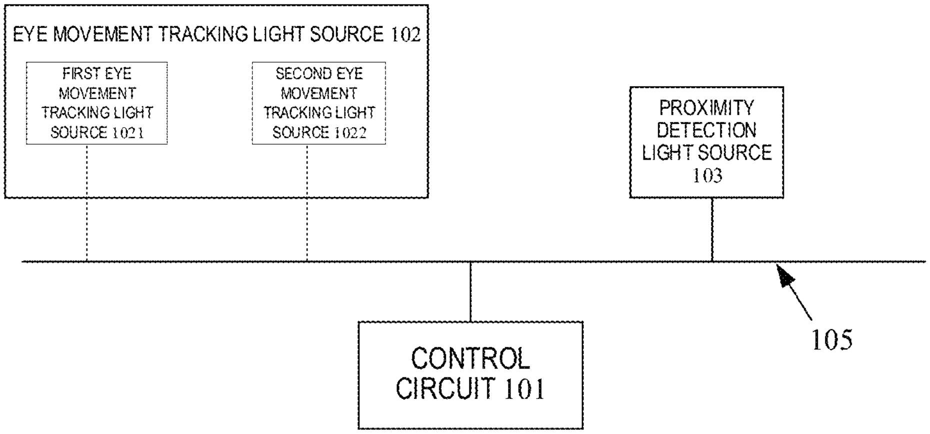
FIG. 1B is a schematic structural diagram of a light source control apparatus according to another embodiment of the disclosure.

In some embodiments, as shown in FIG. 1B, the eye movement tracking light source 102 comprises: a first eye movement tracking light source 1021 and a second eye movement tracking light source 1022;

The control circuit 101 is specifically configured to:

control the first eye movement tracking light source 1021 to be turned off after being turned on for a first predetermined time period, and then control the proximity detection light source 103 to be turned off after being turned on for a second predetermined time period, and then control the second eye movement tracking light source 1022 to be turned off after being turned on for a third predetermined time period.

In a specific implementation, the first eye movement tracking light source 1021 is a left eye movement tracking light source 102, and the second eye movement tracking light source 1022 is a right eye movement tracking light source 102; or, the first eye movement tracking light source 1021 is a right eye movement tracking light source 102, and the second eye movement tracking light source 1022 is a left eye movement tracking light source 102.

The first predetermined time period and the third predetermined time period may be the same or different, preferably, the first predetermined time period and the third predetermined time period are the same, and the specific time period may be set as required, for example, set to 2 ms.

In a specific implementation, for the closing pause time between the two eye movement tracking light sources 102 alternately being turned on, the proximity detection light source 103 is controlled to be turned on for the second predetermined time period (for example, 0.37 ms), so that the middle pause time of the two eye movement tracking light sources 102 is fully utilized, so that the two eye movement tracking light sources 102 can maintain the normal frequency work, and the normal use of the proximity detection light source 103 can be ensured.

After the controller transmit a turning on signal to the proximity detection light source 103, the proximity detection light source 103 is automatically turned off after being turned on for a second predetermined time period, and the controller does not need to transmit a turning off signal to the proximity detection light source 103.

Figure 1C:
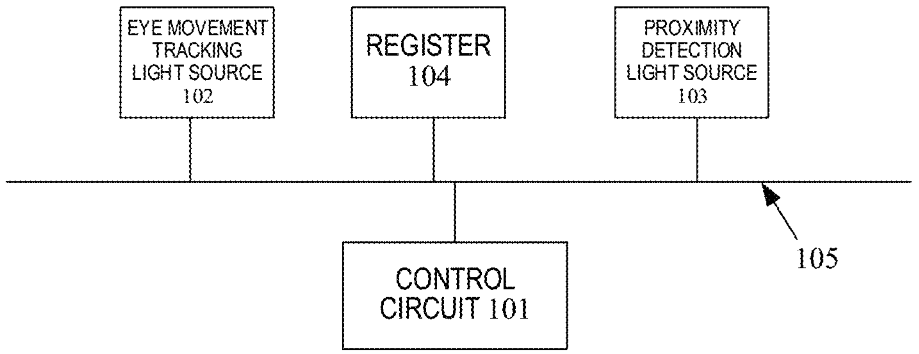
FIG. 1C is a schematic structural diagram of a light source control apparatus according to still another embodiment of the disclosure.

In some embodiments, as shown in FIG. 1C, the apparatus further includes a register 104 connected to the control circuit 101.

The control circuit is configured to control the eye movement tracking light source 102 to be turned off after being turned on for a first predetermined time period, then control the register 104 to start and control the proximity detection light source 103 to be turned off after being turned on for a second predetermined time period;

The register 104 is configured to receive an optical signal fed back by the proximity detection light source 103, and transmit the optical signal to the control circuit 101 for processing.

In a specific implementation, the start time of the register 104 is the same as the start time of the proximity detection light source 103. The setting register 104 can buffer the optical signal correspondingly detected by the proximity detection light source 103, and transmit the optical signal to the control circuit 101, so that the control circuit 101 can analyze and process the optical signal to determine whether there is a proximity signal that an object is close, thereby controlling other circuit devices to cooperate with the close object to work. For example, after the proximity signal is determined, the display screen is controlled to be turned on.

In some embodiments, the register 104 is specifically configured to receive an optical signal when the proximity detection light source 103 is turned on, and receive an optical noise signal when the proximity detection light source 103 is turned off, and transmit the optical signal and the optical noise signal to the control circuit 101;

The control circuit 101 is specifically configured to, after receiving the optical signal and the optical noise signal transmitted from the register 104, remove the optical noise signal from the optical signal to obtain an optical result signal.

In a specific implementation, during the use of the proximity detection light source 103, the proximity detection light source 103 generally has an IR (Infrared Spectroscopy, infrared spectrum) light emission time in a period of time (for example, 0.37 ms), and then detects the intensity of IR reflection during the light emission as an optical signal. Then, the proximity detection light source 103 is controlled to be turned off, and an IR background light noise signal of the environment in which the IR does not emit light (for example, 0.37 ms) is detected; by subtracting the light noise signal from the detection light signal, the reflected IR light intensity of the detection time point is obtained as the light result signal.

In some embodiments, the eye movement tracking light source 102 is periodically turned on according to a first cycle time.

In a specific implementation, the eye movement tracking light source 102 is correspondingly provided with left and right (that is, the first eye movement tracking light source 1021 and the second eye movement tracking light source 1022), both of the two eye movement tracking light sources 102 are periodically turned on according to the first cycle time, the corresponding turning on period may be set according to the number of frames transmitted per second, for example, 90 fps, and the corresponding first cycle time is 11.1 ms.

In some embodiments, the proximity detection light source 103 is periodically turned on according to a second cycle time, wherein the second cycle time is N times of the first cycle time, where N is a positive integer.

In a specific implementation, since the proximity detection does not need to be too high in frequency, for example, it may be detected at approximately 2 seconds, but since the turning on time of the proximity detection light source 103 is when the eye movement tracking light source 102 is turned off, the turning on cycle time of the proximity detection light source 103 is N times (e.g., 100 times) the first cycle time.

In some embodiments, the control circuit is connected to respective electrical elements through an integrated circuit bus 105.

In a specific implementation, the integrated circuit bus 105 is connected to respective electrical elements (for example, the eye movement tracking light source 102, the proximity detection light source 103, or the register 104), so that various signals are transmitted and received through the integrated circuit bus 105, which facilitates the control and signal reception of the controller.

The control process of the light source control apparatus 100 is specifically described below in an embodiment of a specific application scenario.

Figure 2:
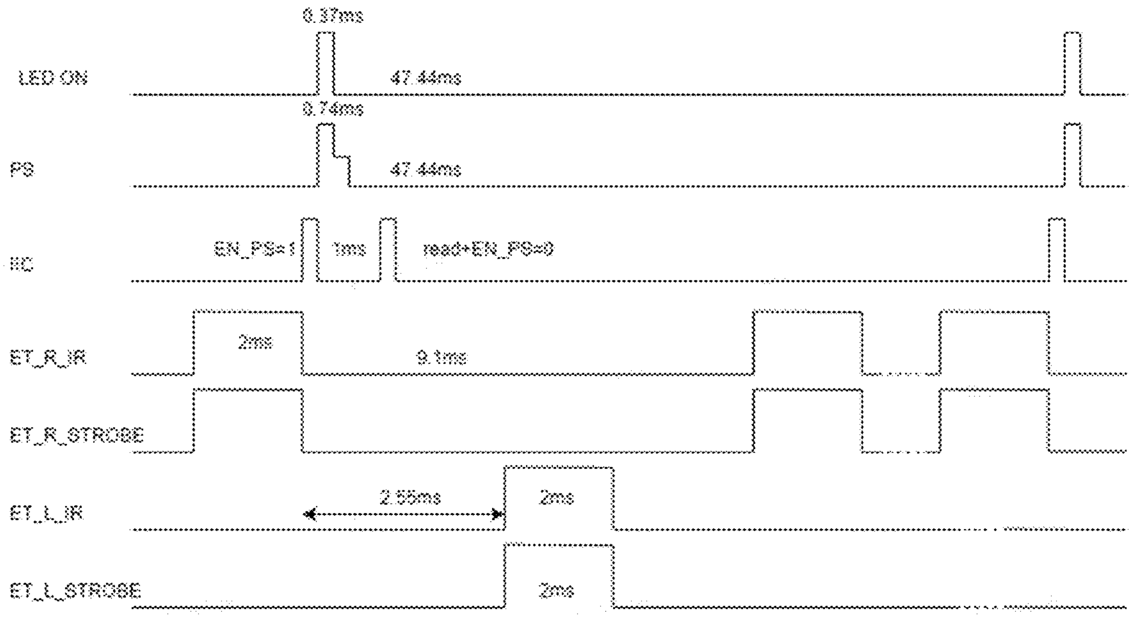
FIG. 2 is a control timing diagram of a light source control apparatus according to an embodiment of the disclosure.

As shown in FIG. 2, the enabling of turning on of the eye movement tracking IR LED lamp (i.e., eye movement tracking light source 102, e.g., ET_R_IR (first eye movement tracking light source 1021) and ET_L_IR (second eye movement tracking light source 1022) in FIG. 2) is enabled by ET_R_STROBE and ET_L_STROBE. That is, ET_R_STROBE enables ET_R_IR turning on, and ET_L_STROBE enables ET_L_IR turning on.

When ET_R_STROBE and ET_L_STROBE are at a high level, ET_R_IR and ET_L_IR are turned on, and when ET_R_STROBE and ET_L_STROBE are at a low level, ET_R_IR and ET_L_IR are turned off; at 90 fps, the maximum turning on time of ET_R_IR and ET_L_IR is 2 ms, ET_R_IR and ET_L_IR are separately turned on, and the middle interval is 2.55 ms. The IR LED lamp for eye tracking is turned on and then is irradiated on the iris of the eye, the iris feature can be extracted to determine the focus point of the eye based on the iris feature.

The proximity sensor may include: an IR lamp close to the detection light source 103 and a register 104 (PS, Proximity Sensor, a register representing a proximity sensor).

When the control circuit 101 detects the falling edge of the ET_R_STROB (i.e., ET_R_IR transitions from on to off), the register 104 (e.g., the PS in FIG. 2) is enabled started and the IR lamp (e.g., LED ON in FIG. 2) of the proximity detection light source 103 is enabled turned on by the integrated circuit bus 105 (e.g., the IIC in FIG. 2). After the register 104 is started, a nearby optical signal can be read, and the starting time period of the register 104 is 0.74 ms (as shown in FIG. 2, the PS is started by 0.74 ms).

Within 0.74 ms started for the register 104, the specific scheme is: the IR lamp (LED ON) of the proximity detection light source 103 is turned on for 0.37 ms, and at this time, the register 104 reads 0.37 ms of the light signal of the IR lamp of the proximity detection light source 103. Since the register 104 (PS) start time period is 0.74 ms, the register 104 (PS) will continue to operate for 0.37 ms within 0.37 ms after the IR lamp of the detection light source 103 is turned off, and the register 104 (PS) reads the optical noise signal within 0.37 ms of the IR lamp turned off period of the proximity detection light source 103. Wherein, the optical noise signal read during the turn off period (0.37 ms) of the IR lamp is an external optical noise signal without an IR light illumination effect.

The register 104 (PS) transmits the data read from the proximity detection light source 103 to the control circuit 101 through the IIC, so that the control circuit 101 subtracts the optical noise signal from the optical signal to obtain the light result signal at the detection time point, and then determines whether there is an object approaching or not according to the light result signal, thereby controlling the operation of the corresponding electrical device.

Figure 3:
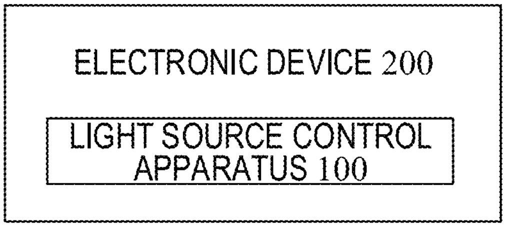
FIG. 3 is a schematic structural diagram of an electronic device according to an embodiment of the disclosure.

Based on the same concept, an embodiment of the disclosure provides an electronic device 200, as shown in FIG. 3, including the light source control apparatus 100 described in the foregoing embodiments. The light source control apparatus 100 has the same technical effect as the light source control apparatus 100 in the above embodiments, and details are not described herein again.

The electronic device may be at least one of a mobile phone, a computer, a tablet, a wearable device, and an extended reality device. Preferably, an extended reality device, XR (Extended Reality, extended reality) refers to a virtual environment that combines real and virtual via a computer, creating a human-machine interactive environment, and refers to a general term of a plurality of technologies such as AR (Augmented Reality, Augmented Reality), VR (Virtual Reality Technology, Virtual Reality), and MR (Mixed Reality). The user may be allowed to interact with the virtual digital world to provide a richer experience for the user. For example, for learning purposes, gaming purposes, content creation purposes, social media and interaction purposes, etc.

An extended reality device is a computer simulation device capable of creating and experiencing a virtual world, and the computer simulation device generates a simulation environment by using a computer program, provides multi-source information fusion, interactive three-dimensional dynamic visual and physical behavior simulation, and can immerse a user in a virtual environment.

The extended reality device comprises a main controller, a DSP (Digital Signal Processing), a memory, a storage, a position sensor, a camera, a radio frequency wireless transmission circuit, an antenna and other units, the spatial position information is collected through the camera, and the position of the handle is obtained through the sensor and the identifier on the handle which are used for indicating the relative position of the Helet Mounted Display (HMD); the radio frequency wireless transmission circuit obtains the angular velocity and gravity acceleration data of the handle, the HMD processes the related data, the HMD calculates the 3D position and the 3D angle information of the handle and the HMD in the space through the acquired data, and updates the image to display the handle model on the screen according to the calculated position and angle.

Based on the same concept, an embodiment of the disclosure provides a light source control method applied to a control circuit, the control circuit being respectively connected to an eye movement tracking light source and a proximity detection light source.

Figure 4A:
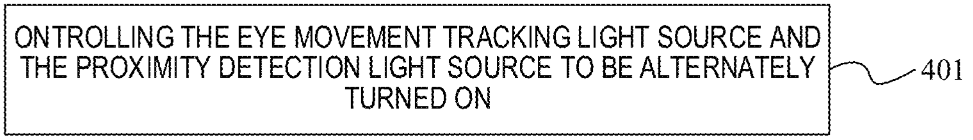
FIG. 4A is a flowchart of a light source control method according to an embodiment of the disclosure.

As shown in FIG. 4A, the method includes the following steps.

Step 401: controlling the eye movement tracking light source and the proximity detection light source to be alternately turned on.

In some embodiments, the control circuit is connected to a register, and the register receives an optical signal when the proximity detection light source is turned on, and receives an optical noise signal when the proximity detection light source is turned off.

Figure 4B:
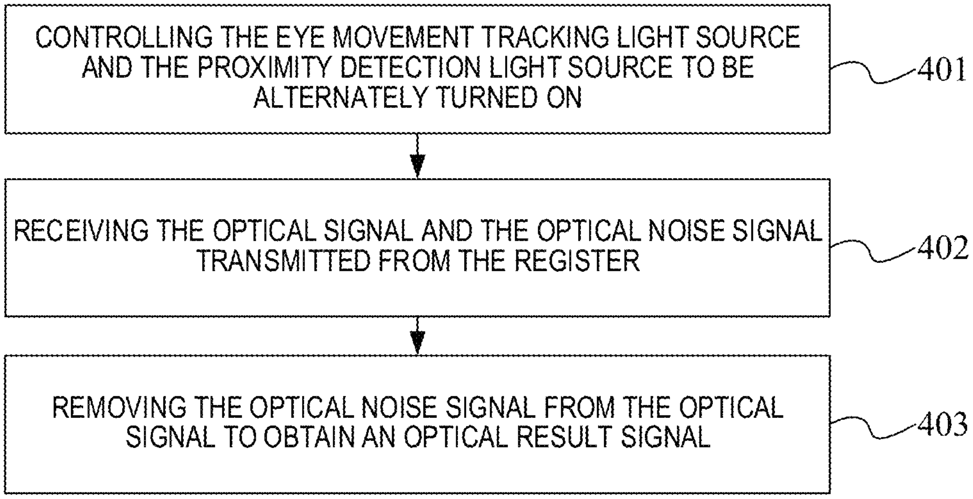
FIG. 4B is a flowchart of a light source control method according to another embodiment of the disclosure.

As shown in FIG. 4B, the method further includes the following steps.

Step 402: receiving the optical signal and the optical noise signal transmitted from the register.

Step 403: removing the optical noise signal from the optical signal to obtain an optical result signal.

In some embodiments, step 401 includes:

controlling the eye movement tracking light source to be turned on periodically according to a first cycle time, and/or controlling the proximity detection light source to be turned on periodically according to a second cycle time to complete the alternate turning on of the eye movement tracking light source and the proximity detection light source. The second cycle time is N times of the first cycle time, where N is a positive integer.

Through the description of the above embodiments, the control circuit controls the eye movement tracking light source and the proximity detection light source to be alternately turned on, so that the eye movement tracking light source and the proximity detection light source do not be turned on at the same time, and the light of each other does not interfere with each other, so that the accuracy of the detection result of the eye movement tracking light source is improved, and meanwhile, the accuracy of the detection result of the proximity detection light source can be improved.

The control circuit in this embodiment is preferably the control circuit in the light source control apparatus described in the above embodiments, and has the same connection relationship and function as the control circuit in the light source control apparatus, and details are not described herein again.

It should be noted that some embodiments of the disclosure are described above. Other embodiments are within the scope of the appended claims. In some cases, the acts or steps recited in the claims may be performed in a different order than in the above embodiments and still achieve the desired results. Additionally, the processes depicted in the figures do not necessarily require a particular order or sequential order shown to achieve the desired results. In certain embodiments, multitasking and parallel processing are also possible or may be advantageous.

Based on the same concept, corresponding to the method of any of the above embodiments, the disclosure further provides a non-transitory computer-readable storage medium storing computer instructions for causing the computer to perform the method according to any of the above embodiments.

Computer-readable media of the present embodiments include permanent and non-permanent, removable and non-removable media that can be stored by any method or technology. The information may be computer readable instructions, data structures, modules of a program, or other data. Examples of computer storage media include, but are not limited to, phase change memory (PRAM), static random access memory (SRAM), dynamic random access memory (DRAM), other types of random access memory (RAM), read only memory (ROM), electrically erasable programmable read only memory (EEPROM), flash memory or other memory technology, compact disc read-only memory (CD-ROM), digital versatile disc (DVD) or other optical storage, magnetic cassettes, magnetic tape magnetic disk storage or other magnetic storage devices, or any other non-transmission medium, which can be used to store information that can be accessed by a computing device.

The computer instructions stored in the storage medium in the foregoing embodiments are configured to cause the computer to perform the method according to any of the foregoing embodiments, and have the beneficial effects of the corresponding method embodiments, and details are not described herein again.

Based on the same concept, corresponding to any embodiment method described above, the disclosure further provides a computer program product, including a computer program instruction, which, when executed on a computer, cause the computer to perform the method according to any of the foregoing embodiments, and has a corresponding beneficial effect of the method embodiment, and details are not described herein again.

It should be understood by those of ordinary skill in the art that the foregoing discussion of any embodiment is merely exemplary, and is not intended to suggest that the scope of the disclosure (including the claims) is limited to these examples; in the spirit of the disclosure, the above embodiments or the technical features in different embodiments may also be combined, and the steps may be implemented in any order, and there are many other changes in different aspects of the embodiments of the disclosure as described above, and they are not provided in detail for the sake of brevity.

Additionally, for simplicity of illustration and discussion, and to not obscure embodiments of the disclosure, well-known power/ground connections to integrated circuit (IC) chips and other components may or may not be shown in the figures provided. Furthermore, the apparatus may be shown in block diagram form in order to avoid obscuring the embodiments of the disclosure, and this also takes into account the fact that the details regarding the implementation of these block diagram apparatus are highly dependent on the platform in which the embodiments of the disclosure are to be implemented (i.e., these details should be fully within the understanding of those skilled in the art). Having set forth specific details (e.g., circuits) to describe exemplary embodiments of the disclosure, it will be apparent to those skilled in the art that embodiments of the disclosure may be practiced without these specific details or with changes to these specific details. Accordingly, these descriptions should be considered illustrative and not limiting.

Although the disclosure has been described in conjunction with specific embodiments of the disclosure, many alternatives, modifications and variations of these embodiments will be apparent to those of ordinary skill in the art from the foregoing description. For example, other memory architectures (e.g., dynamic RAM (DRAM)) may use the embodiments discussed.

The disclosure is intended to cover all such alternatives, modifications and variations that fall within the broad scope of the appended claims. Therefore, any omission, modification, equivalent replacement, improvement and the like that are made within the spirit and principle of the embodiments of the disclosure should be included within the protection scope of the disclosure.

I claim:

1. A light source control apparatus, comprising: an eye movement tracking light source, a proximity detection light source, a control circuit and a register connected to the control circuit, the control circuit being respectively connected to the eye movement tracking light source and the proximity detection light source, wherein the control circuit is configured to control the eye movement tracking light source and the proximity detection light source to be alternately turned on and the control circuit is configured to control the eye movement tracking light source to be turned off after being turned on for a first predetermined time period, then control the register to start and control the proximity detection light source to be turned off after being turned on for a second predetermined time period; and the register is configured to receive an optical signal fed back from the proximity detection light source, and transmit the optical signal to the control circuit for processing.

2. The apparatus of claim 1, wherein the eye movement tracking light source comprises: a first eye movement tracking light source and a second eye movement tracking light source; and the control circuit is specifically configured to:

control the first eye movement tracking light source to be turned off after being turned on for the first predetermined time period, and then control the proximity detection light source to be turned off after being turned on for the second predetermined time period, and then control the second eye movement tracking light source to be turned off after being turned on for a third predetermined time period.

3. The apparatus of claim 1, wherein the register is specifically configured to receive an optical signal when the proximity detection light source is turned on, and receive an optical noise signal when the proximity detection light source is turned off, and transmit the optical signal and the optical noise signal to the control circuit; and the control circuit is specifically configured to, after receiving the optical signal and the optical noise signal transmitted from the register, remove the optical noise signal from the optical signal to obtain an optical result signal.

4. The apparatus of claim 1, wherein the eye movement tracking light source is periodically turned on according to a first cycle time.

5. The apparatus of claim 4, wherein the proximity detection light source is periodically turned on according to a second cycle time, wherein the second cycle time is N times of the first cycle time, where N is a positive integer.

6. The apparatus of any of claim 1, wherein the control circuit is connected to respective electrical elements through an integrated circuit bus.

7. A light source control method comprising:

controlling an eye movement tracking light source and a proximity detection light source to be alternately turned on, wherein the method is applied to a control circuit, the control circuit being respectively connected to the eye movement tracking light source and the proximity detection light source and the control circuit is connected to a register, and the method further comprises:

controlling the eye movement tracking light source to be turned off after being turned on for a first predetermined time period, then controlling the register to start and controlling the proximity detection light source to be turned off after being turned on for a second predetermined time period, wherein the register receives an optical signal fed back from the proximity detection light source, and transmits the optical signal to the control circuit for processing.

8. The method of claim 7, wherein the eye movement tracking light source comprises a first eye movement tracking light source and a second eye movement tracking light source, and the method further comprises:

controlling the first eye movement tracking light source to be turned off after being turned on for the first predetermined time period, and then controlling the proximity detection light source to be turned off after being turned on for the second predetermined time period, and then controlling the second eye movement tracking light source to be turned off after being turned on for a third predetermined time period.

9. The method of claim 7, wherein the control circuit is connected to a register, and the register receives an optical signal when the proximity detection light source is turned on, and receives an optical noise signal when the proximity detection light source is turned off; and wherein the method further comprises:

receiving the optical signal and the optical noise signal transmitted from the register; and removing the optical noise signal from the optical signal to obtain an optical result signal.

10. The method of claim 7, wherein controlling the eye movement tracking light source and the proximity detection light source to be alternately turned on comprises:

controlling the eye movement tracking light source to be turned on periodically according to a first cycle time, and/or controlling the proximity detection light source to be turned on periodically according to a second cycle time to complete the alternate turning on of the eye movement tracking light source and the proximity detection light source, wherein the second cycle time is N times of the first cycle time, where N is a positive integer.

11. A non-transitory computer-readable storage medium storing computer instructions, wherein the computer instructions are configured to cause a computer to perform acts comprising:

controlling an eye movement tracking light source and a proximity detection light source to be alternately turned on, wherein the acts are applied to a control circuit, the control circuit being respectively connected to the eye movement tracking light source, the proximity detection light source and the control circuit is connected to a register, and the acts further comprise:

controlling the eye movement tracking light source to be turned off after being turned on for a first predetermined time period, then controlling the register to start and controlling the proximity detection light source to be turned off after being turned on for a second predetermined time period, wherein the register receives an optical signal fed back from the proximity detection light source, and transmits the optical signal to the control circuit for processing.

12. The non-transitory computer-readable storage medium of claim 11, wherein the eye movement tracking light source comprises: a first eye movement tracking light source and a second eye movement tracking light source, and the acts further comprise:

controlling the first eye movement tracking light source to be turned off after being turned on for the first predetermined time period, and then controlling the proximity detection light source to be turned off after being turned on for the second predetermined time period, and then controlling the second eye movement tracking light source to be turned off after being turned on for a third predetermined time period.

13. The non-transitory computer-readable storage medium of claim 11, wherein the control circuit is connected to a register, and the register receives an optical signal when the proximity detection light source is turned on, and receives an optical noise signal when the proximity detection light source is turned off;

wherein the acts further comprise:

receiving the optical signal and the optical noise signal transmitted from the register; and removing the optical noise signal from the optical signal to obtain an optical result signal.

14. The non-transitory computer-readable storage medium of claim 11, wherein controlling the eye movement tracking light source and the proximity detection light source to be alternately turned on comprises:

controlling the eye movement tracking light source to be turned on periodically according to a first cycle time, and/or controlling the proximity detection light source to be turned on periodically according to a second cycle time to complete the alternate turning on of the eye movement tracking light source and the proximity detection light source, wherein the second cycle time is N times of the first cycle time, where N is a positive integer.

* * * * *